United States Patent [19]
Gouselis

[11] Patent Number: 5,921,141
[45] Date of Patent: Jul. 13, 1999

[54] OPERATING DEVICE FOR A MOTOR VEHICLE TRANSMISSION

[75] Inventor: Michail Gouselis, Kleinaitingen, Germany

[73] Assignee: Bayerische Motoren Werke Aktiengesellschaft, Munich, Germany

[21] Appl. No.: 08/911,190

[22] Filed: Aug. 14, 1997

[30] Foreign Application Priority Data

Aug. 14, 1996 [DE] Germany .................. 196 32 859

[51] Int. Cl.$^6$ .............. G05G 9/00; B60K 20/00
[52] U.S. Cl. ............. 74/473.33; 74/473 R; 74/471 XY
[58] Field of Search ............ 74/473.33, 471 XY, 74/473.27, 437.34, 473.31, 473.32; 180/133

[56] References Cited

U.S. PATENT DOCUMENTS

| | | | |
|---|---|---|---|
| 4,132,124 | 1/1979 | Iida .............................. | 74/473 R |
| 4,157,740 | 6/1979 | Jackson ........................ | 74/473 R |
| 4,526,055 | 7/1985 | Batchelor et al. ............. | 74/471 XY |
| 4,671,131 | 6/1987 | Hurlow ......................... | 74/471 XY |
| 4,916,965 | 4/1990 | Wardenier et al. ........... | 74/471 XY |
| 5,249,477 | 10/1993 | Wardenier .................... | 74/473 R |
| 5,497,847 | 3/1996 | Ota et al. ..................... | 74/471 XY |

Primary Examiner—Charles A. Marmor
Assistant Examiner—Roger Pang
Attorney, Agent, or Firm—Evenson, McKeown, Edwards & Lenahan, P.L.L.C.

[57] ABSTRACT

An operating device for a motor vehicle transmission is described which has a shift lever which, for shifting between transmission ratios, is movably mounted on the motor vehicle. In particular, the shift lever can be shifted in a respective shifting channel about a shifting axis essentially in the longitudinal direction of the vehicle and, for selecting between different shifting channels, can be swivelled in at least one selection channel about a selection axis essentially in the transverse direction of the vehicle. A motion gearing connects the shift lever with at least one transmission control shaft of a motor vehicle transmission, in which case a motor vehicle transmission case is linked to the motion gearing. The shift lever is mounted on a vehicle-body-fixed vehicle part and, in a projection onto a shifting plane, the motion gearing consists of at least one parallelogram linkage. During a shifting and/or selecting movement of the shift lever, three rods of the linkage are changed in their position and one rod maintains its position which, on its one end is swivellably mounted in the shifting plane on a vehicle part fixed to the vehicle body and, on its other end, is movably connected with the motor vehicle transmission case by way of at least so many degrees of freedom that any spatial movement of the motor vehicle transmission is possible without causing reaction forces in the motion gearing.

23 Claims, 3 Drawing Sheets

OPERATING DEVICE FOR A MOTOR VEHICLE TRANSMISSION

BACKGROUND AND SUMMARY OF THE INVENTION

This application claims the priority of German application 196 32 859.4 filed in Germany on Aug. 14, 1996, the disclosure of which is expressly incorporated by reference herein.

The invention relates to an operating device for a motor vehicle transmission of the type having a shift lever which, for shifting between transmission ratios, is movably mounted on the motor vehicle, particularly can be swivelled in one shifting channel respectively about a shifting axis essentially in the longitudinal direction of the vehicle, and, for selecting between different shifting channels in at least one selection channel can be swivelled about a selection axis essentially in the transverse direction of the vehicle, and which, by way of a motion gearing, is connected with at least one transmission control shaft of the motor vehicle transmission, a motor vehicle transmission case being linked to the motion gearing.

German Patent Document DE 26 58 274 B2 describes a bearing for a manual lever for a gearbox of vehicles in which the manual lever is connected with the gearbox by way of a motion gearing having a support rod and a shift rod. By way of a ball-and-socket joint and additional linkage members, the manual lever is movably connected in the shifting direction and the selecting direction with the vehicle floor as well as with the support rod. The bearing for the manual lever has the task of absorbing vibrations of the gearbox effectively in front of the manual lever while the construction of the suspension and bearing members is compact.

However, such a bearing can have a disadvantageous effect when the motor vehicle transmissions and the manual levers have, for example, an unfavorable position with respect to the driver's sitting position. Since movements of the motor vehicle transmission are transmitted by way of the motion gearing to the manual lever, this lever moves at different amplitudes depending on how long it is. This can impair the shifting feel for the driver and influence the driving comfort.

It is therefore an object of the invention to provide an operating device for a motor vehicle transmission in which case the motion gearing to the motor vehicle transmission is designed such that the shift lever maintains its position while the motor vehicle transmission can move in any direction with respect to the space.

According to the invention, this object is achieved by providing an operating device of the above noted type, wherein the shift lever is mounted on a vehicle part fixed to the vehicle body, and the motion gearing, in a projection onto a shifting plane, includes at least one parallelogram linkage of four rods, one rod being fixedly connected with the shift lever, and during a shifting and/or selecting movement of the shift lever, three rods being changed in their position, and one rod maintaining its position, which rod, on its one end, in the shifting plane being swivellably mounted on a vehicle part fixed to the vehicle body and, on its other end, being connected with the motor vehicle transmission case while being movable over at least so many degrees of freedom that each spatial movement of the motor vehicle transmission case is possible without causing reaction forces in the motion gearing, the rod which is fixedly connected with the shift lever maintaining its position and the other three rods being changed in their position.

According to the invention, the shift lever is movably mounted at least in the shifting and selecting direction on a vehicle part fixed to the vehicle body and, viewed in the projection onto the shifting plane, the motion gearing to the motor vehicle transmission includes at least one parallelogram linkage consisting of four rods, one rod being fixedly connected with the shift lever and, during a shifting and/or selecting movement of the shift lever, three rods being changed in their position and one rod maintaining its position. On its one end, this rod is swivellably in the shifting plane mounted on a vehicle-body-fixed vehicle part and, on its other end, is connected movably by at least so many degrees of freedom with the motor vehicle transmission case that any spatial movement of the motor vehicle transmission case is possible without causing reaction forces in the motion gearing. In the case of a spatial movement of the motor vehicle transmission case, that rod will then maintain its position which is fixedly connected with the shift lever and the other three rods are changed in their position.

An operating device of this type for a motor vehicle transmission has the advantage that the shift lever can be mounted anywhere on the body of a vehicle. As a result, its length is independent of the driver's sitting position even if this sitting position has, for example, a larger vertical distance from the transmission, as for example, in the case of vans or trucks. A relatively short shift lever can be mounted in this manner in the driver's proximity and, during its operation, the motion gearing transmits the movements at the ratios selected in the case of the construction in the selecting and shifting direction to the motor vehicle transmission. In this case, the shift lever is disposed free from vibrations and is uncoupled from all spatial movements and vibrations of the transmission line relative to the vehicle body. Even when a shift lever is very long, no movement of the shift knob of the shift lever takes place during a movement of the vehicle transmission relative to the vehicle body.

In preferred embodiments of the operating device, the three rods of the parallelogram linkage which are changed in their position during a shifting and/or selecting movement of the shift lever, viewed in a projection onto the shifting plane, are the shift lever between the shifting axis and a first connection joint to a coupling element; the coupling element between the first connection joint and a second connection joint to a connection element; and the connection element between the second connection joint and a third connection joint to a fourth rod, the holding element. In this case, the rod of the parallelogram linkage which maintains its position during a shifting and/or selecting movement of the shift lever is formed by the fourth rod, between the third connection joint and the axis of rotation of the shift lever in the shifting direction. On its one end, the fourth rod is swivellably about a fastening axis linked to a vehicle part fixed to the body and, on its other end, is rotatably in all directions mounted on the connection element, the axis of rotation of the shift lever in the shifting direction and the fastening axis, when the shift lever is not deflected into the selecting direction, extending coaxially. Furthermore, from the other end of the fourth rod, the connection is established to the motor vehicle transmission case by means of a support rod.

Advantageously, the connection element consists of an angle lever whose end of a first leg is swivellably connected with a shift rod and whose end of a second lever is movably connected with the coupling element such that the selecting movement as well as the shifting movement of the shift lever is transmitted to the shift rod by way of the coupling element and the angle lever. In a particularly advantageous embodiment of the invention, the angle lever is mounted on the holding element by way of a ball-and-socket joint.

In a particularly simple embodiment, the support rod to the motor vehicle transmission case is swivellably mounted on the fourth rod, the swivel axis extending through the center point of the ball-and-socket joint. In this case, the fourth rod as the holding element consists of two holding element parts which are connected by a joint such that they can be rotated with respect to one another about the longitudinal axis of the holding element.

In another preferred embodiment of the invention, the coupling element is to be constructed in a simple manner if it consists of two coupling rods which, together with the shift lever and the connection element, form a four-bar mechanism in a plane perpendicular to the shifting plane, in which case at least two members of the four-bar mechanism—the shift lever and the connection element—are guided in parallel to one another. By way of the length of the two coupling rods, the ratio of the motion gearing can advantageously be influenced in the selecting direction. It can be selected to be equal to, larger or smaller than the ratio in the shifting direction and is therefore independent of it. In this case, the fourth rod—the holding element—extends in parallel to the plane of the four-bar mechanism.

Other objects, advantages and novel features of the present invention will become apparent from the following detailed description of the invention when considered in conjunction with the accompanying drawings.

DETAILED DESCRIPTION OF THE DRAWINGS

Figure 1:
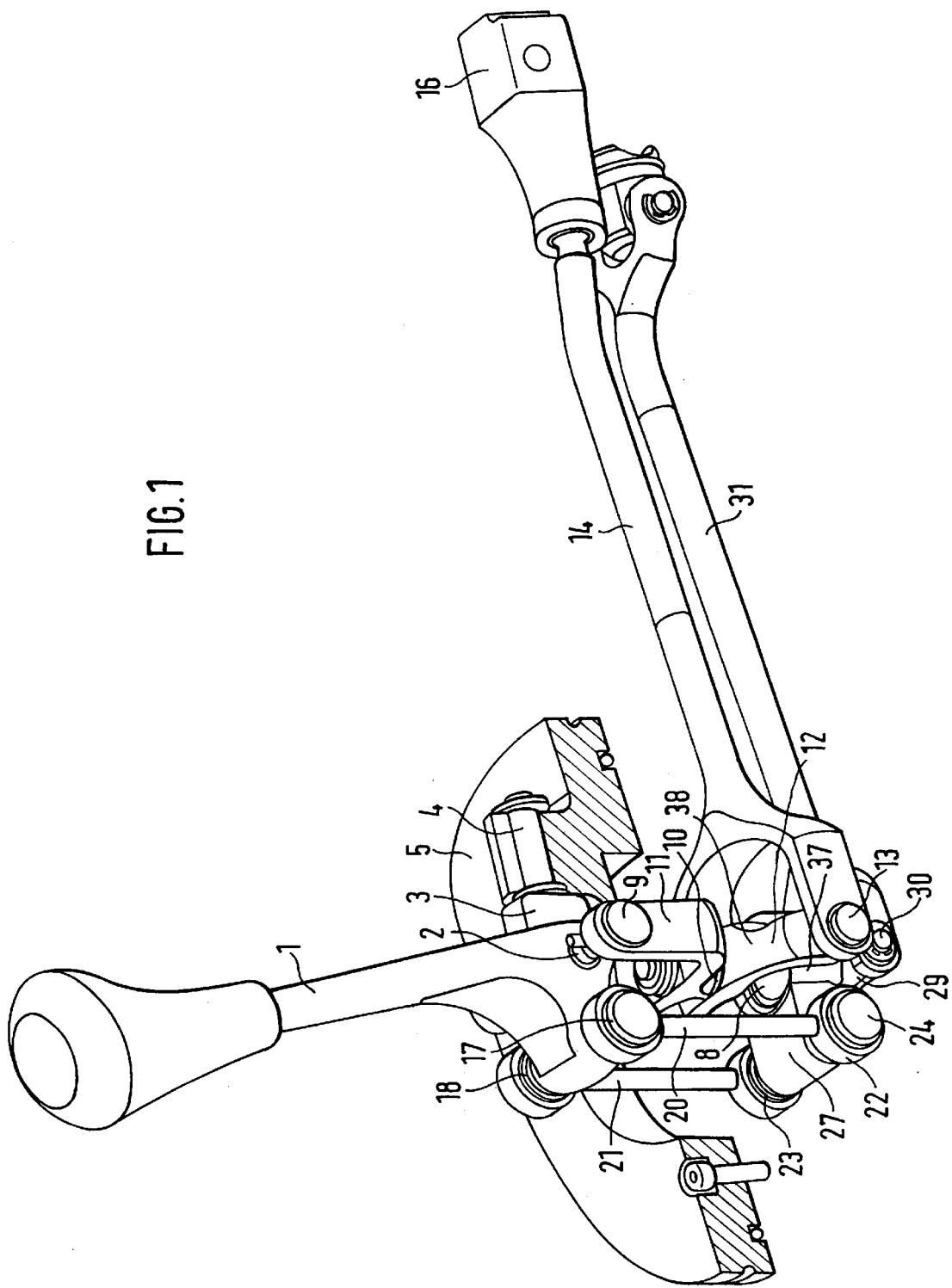
FIG. 1 is a perspective overall view of an operating device for a motor vehicle transmission constructed according to a preferred embodiment of the present invention.
Figure 2:
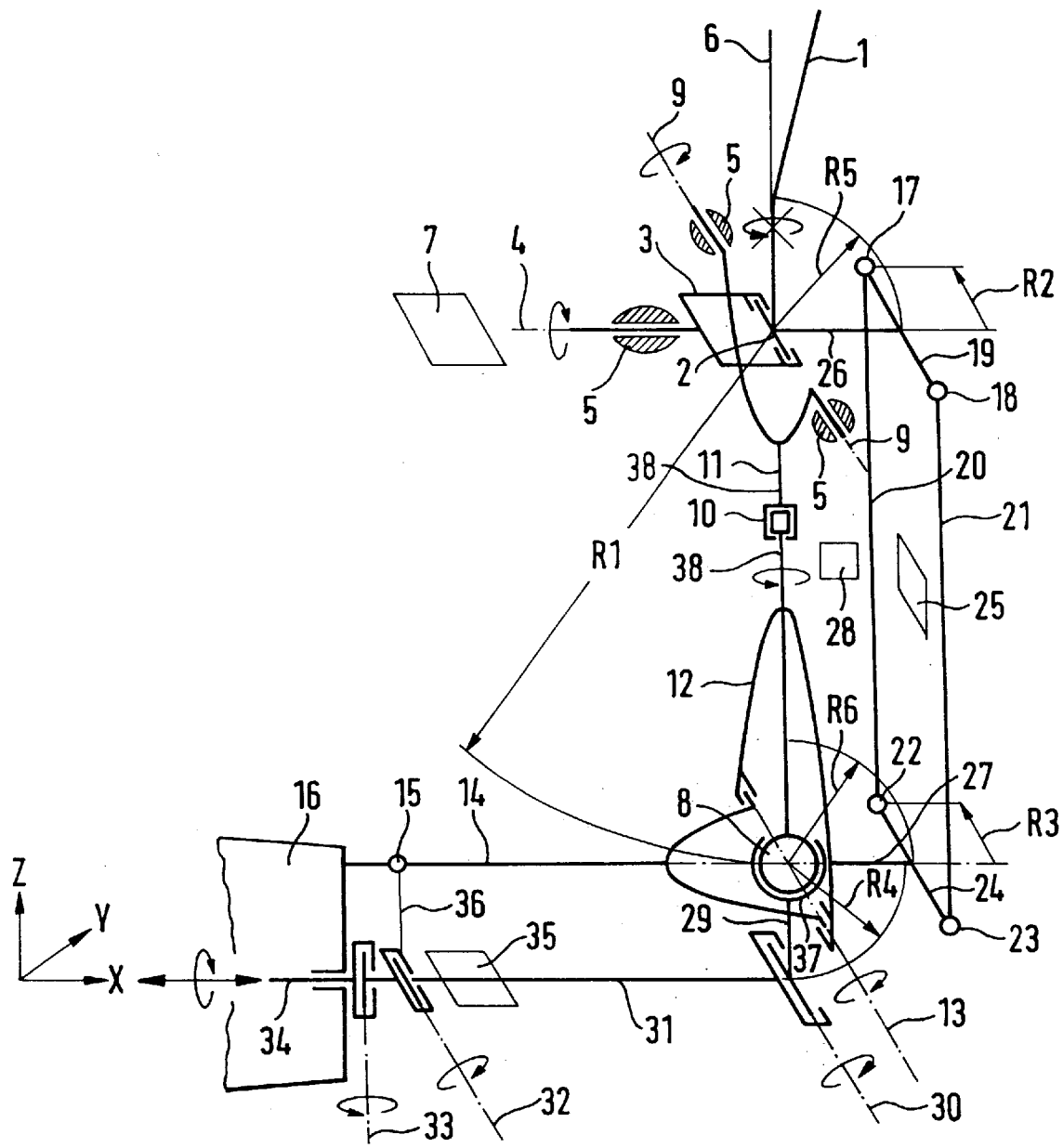
FIG. 2 is a view of the operating device of FIG. 1 illustrated with reversed sides as a kinematic model.

In FIG. 1, which is a constructive implementation of the kinematic model from FIG. 2, the individual components of the operating device for a motor vehicle transmission are explained first. The kinematic relationship and the function of the individual components will then be illustrated in the description of FIG. 2.

In FIG. 1, reference number 1 indicates a shift lever which is mounted fixed to the vehicle body on a console 5 by way of a shift axis receiving device 3 to be swivellable about a shifting axis 2 and a selecting axis 4. When the shift lever 1 is swivelled, it operates a coupling element which consists of two coupling rods 20, 21 which are connected with the shift lever 1 by way of first ball-and-socket joints 17, 18. In this case, a first axis 19 (FIG. 2), which connects the first ball-and-socket joints 17 and 18, extends in parallel to the shifting axis 2. The coupling rods 20, 21, are again fastened by way of second ball-and-socket joints 22, 23 on a connection element constructed as an angle lever 37. The coupling element is designed such that the first axis 19 (FIG. 2) extends in parallel to a second axis 24—the connection axis of the second ball-and-socket joints 22, 23.

The connection element constructed as an angle lever 37 is movably fastened by way of a third ball-and-socket joint 8 on a holding element 38 and, on the end of a first leg 29, carries a shift rod 31 which is disposed to be swivellable about a third axis 30. The shift rod 31 is the connection carrying out the shifting movement to a transmission control shaft 34 (FIG. 2) of the motor vehicle transmission which is not shown, but is housed in transmission case 16. The second axis 24 and the third axis 30 extend in parallel to one another.

On the lower holding element part 12 at the holding element 38, the angle lever 37 is mounted by way of the third ball-and-socket joint 8. By means of an upper holding element part 11 of holding element 38 it is swivellably supported about a fastening axis 9 mounted on the console 5. When the shift lever is not deflected in the selecting direction, the shift axis 2 and the fastening axis 9 extend coaxially but are uncoupled from one another when the shift lever 1 is moved into the selecting direction. Both holding element parts 11, 12 of holding element 38 are connected with one another by a joint 10 such that they can be rotated with respect to one another about a common longitudinal axis of the holding element parts 11, 12. On another end of the holding element 38, support rod 14 is connected by the angle lever 37. Support rod 14 is swivellably connected at its other end to a motor vehicle transmission case 16 which is only outlined.

The kinematic function model in FIG. 2 shows more clearly than the representation in FIG. 1 that, by way of the selecting axis 4, the shift axis receiving device 3 is swivellably disposed on a console 5 fixed to the vehicle body. The shift lever 1 can be operated in the shifting direction about the shifting axis 2. This shifting axis 2 is disposed in the shifting axis receiving device 3. By means of it, it can be swivelled about the selecting axis 4. In the selecting direction, the shift lever 1 and the shifting axis receiving device 3 are jointly rotated about the selecting axis 4. The shift lever 1 has two degrees of freedom. The shifting axis 2 and the selecting axis 4 are perpendicularly disposed with respect to one another and are situated on a common plane 7.

However, it would also be conceivable according to other embodiments of the invention to dispose the shift lever 1 in the plane 7 by way of a ball-and-socket joint in the console 5.

The movement of the shift lever 1 for shifting between transmission ratios is transmitted by way of a motion gearing to the transmission control shaft 34. Viewed in a projection onto a shifting plane 28, the motion gearing consists of at least one parallelogram linkage consisting of four rods, in which case a first rod 26 is formed by the shift lever 1; a second rod is formed by the coupling element 20, 21; and a third rod is formed by the connection element 37, 27. The fourth rod of the parallelogram linkage is formed by the holding element 38 which maintains its position during a shifting and/or selection movement of the shift lever 1.

It can clearly be recognized that the holding element 38 is swivellably disposed by means of its one end by way of the fastening axis 9 in the console 5. The shifting axis 2 and the fastening axis 9 are coaxial with respect to one another when the shift lever 1 is situated at its outlined neutral point. The third ball-and-socket joint 8 can rotate like a pendulum about the fastening axis 9 with the constant radius R1. Its distance to the fastening axis 9 cannot be changed. The holding element 38 is divided into two parts. The lower holding element part 12 with the third ball-and-socket joint 8, because of the joint 10, can additionally rotate about the longitudinal axis of the holding element 38 relative to the upper holding element part 11. The third ball-and-socket joint 8 itself has three degrees of freedom.

The swivel axis 13 is disposed in the lower holding element part 12. The support rod 14 can rotated about this swivel axis 13. The swivel axis 13 extends through the center point of the third ball-and-socket joint 8 and is parallel to the common plane 7 of the shifting axis 2 and the selecting axis 4. In the mounted position, when the shift lever 1 is at its neutral point, the swivel axis 13 is, in addition, parallel to the fastening axis 9. However, in the operation, because of the joint 10, it can rotate with the holding element part 12 about the longitudinal axis of the holding element 38.

On its transmission-side end, the support rod 14 is fastened by means of a fourth ball-and-socket joint 15 on the motor vehicle transmission case 16. The distance of the third ball-and-socket joint to the fourth ball-and-socket joint 15 and therefore also to the motor vehicle transmission case 16 is therefore established. The fourth ball-and-socket joint 15 itself has three degrees of freedom so that the support rod 14 can absorb only pressure and tension forces and no torques. Thus, via the other end of support rod 14, the holding element 38 is connected, such that the motor vehicle transmission case 16 is movable over at least so many degrees of freedom that each spatial movement of the motor vehicle transmission case 16 is possible without causing reaction forces in the motion gearing, in which case the first rod 26 maintains its position and the other three rods, the holding element 38, the second leg 27 and the coupling element 20, 21 are changed in their position.

As the first connection joint of the parallelogram linkage, the first ball-and-socket joints 17, 18 are fastened on the shift lever 1 and their connection axis—the first axis 19—is parallel to the shifting axis 2. The coupling element consisting of the coupling rods 20, 21 is fastened by way of the first ball-and-socket joints 17, 18 on the first axis 19. The first ball-and-socket joints 17, 18 have three degrees of freedom.

On the other end of the coupling rods 20, 21, these are connected by way of second ball-and-socket joints 22, 23 as the second connection joint of the parallelogram linkage with the second axis 24 which extends in parallel to the first axis 19. The two coupling rods 20, 21 can be parallel to one another. However, this is no prerequisite. If the two coupling rods 20, 21 are parallel, they form, together with the shift lever 1 and the angle lever 37, another parallelogram linkage in a plane 25 perpendicular to the shifting plane 28. If, in contrast, the coupling rods 20, 21 are not parallel, the first ball-and-socket joints 17, 18, together with the second ball-and-socket joints 22, 23, form a trapezoidal four-bar mechanism in the same plane 25 in which the additional parallelogram linkage is also situated with equally large radii R2 and R3. As a result of different lengths of the radii R2 and R3, a ratio of the motion gearing is determined for the transmission of the movement of the shift lever 1 about the selecting axis 4. This selection ratio is also influenced by the length R4 of the first leg 29 of the angle lever 37 and the length of the shift lever 1. The following relationship will then apply to the selection ratio I=(R3·L1)/(R2·R4) for R3=R2 will then be I=L1/R4, wherein L1 is the length of the shift lever 1.

The first rod 26 of the parallelogram linkage connects the first axis 19 with the shift axis 2 of the shift lever 1. As the third rod of the parallelogram linkage, the second leg 27 of the connection element connects the second axis 24 with the third connection joint, the ball-and-socket joint 8. The first rod 26 is parallel to the third rod and is perpendicular to the first axis 19. The third rod is also perpendicular to the second axis 24. As the fourth rod of the parallelogram linkage, the holding element 38, which connects the shifting axis 2 with the third ball-and-socket joint 8, is parallel to the plane 25 of the four-bar mechanism or of the additional parallelogram linkage. The first rod 26, the holding element 38 and the third rod are situated on the shifting plane having the reference number 28 which is perpendicular to the plane 25 of the four-bar mechanism and form a parallelogram together with the coupling element. The distance of the first rod 26 from the first ball-and-socket joints 17, 18 is the same. The distance of the third rod from the second ball-and-socket joints 22, 23 is also the same. The third rod corresponds to the second leg 27 of the angle lever 37 and is rigidly connected with the first leg 29 of the angle lever 37. Their intersection point is the center point of the third ball-and socket joint 8.

The third axis 30 is perpendicular to the first leg 29 of the angle lever 37. The shift rod 31 is perpendicular to the third axis 30. The shift rod 31 must be perpendicular to the first leg 29 of the angle lever 37 only when the shift lever 1 is in its mounted position. By joints with the axes 32 and 33, which are perpendicular to one another and rigidly connected with one another, it is illustrated that the shift rod 31 can exercise forces on the transmission control shaft 34 only in the X-direction and torques only about the X-axis. The transmission control shaft 34 therefore has two degrees of freedom.

During a movement of the shift lever 1 about the selecting axis 4, this shift lever 1 rotates together with the shifting axis receiving device 3. This has the result that the first axis 19 is rotated by the first rod 26 also about the selecting axis. The first ball-and-socket joints 17, 18 rotate about the selection axis 4 with the radius R2 which corresponds to half the length of the first axis 19. The coupling rods 20 and 21 translate this rotating movement into a linear movement. The second ball-and-socket joints 22, 23 in the process move on the circle with the radius R3 which corresponds to half the length of the second axis 24. Since the third rod, the first leg 29 and the third axis 30 are formed by the angle lever 37 and are therefore rigidly connected with one another, these rotate about the third ball-and-socket joint 8. The rotating radius of the third axis 30 is R4. By means of this rotating movement, the transmission control shaft 34 is rotated by way of the shift rod 31 and the axes 32 and 33 until the corresponding gear is selected. The reaction forces of the selection operation are transmitted by the holding element 38 to the fastening axis 9 and thus by way of the console 5 to a vehicle-fixed part, for example, the floor panel of the vehicle.

During a movement of the shift lever 1 in the shifting direction, this shift lever 1 is rotated about the shift axis 2. The first axis 19—through the first rod 26—also rotates about the shift axis 2 with the radius R5. The coupling rods 20, 21 translate this rotating movement into a linear movement. The second axis 24—through the third rod—rotates about the third ball-and-socket joint 8 with the radius R6. The third axis 30 rotates about the third ball-and-socket joint 8 with the radius R4. By means of this rotating movement, the transmission control shaft 34 is caused to carry out a linear movement and shifts the corresponding gear. As the intermediate element, the shift rod 31 and the axes 32 will transmit this movement. The support rod 14 takes over a portion of the reaction forces during the shifting operation and, in the process, is supported on the motor vehicle transmission case 16. A portion of the reaction forces is transmitted by the holding element 38 to the fastening axis 9 and thus by way of the console 5 to a vehicle-fixed part, for example, the floor panel of the vehicle. The radii R5 and R6 must have the same size. In this case, the shifting ratio is i=L1/R4.

For comparing the selection ratio I with the shift ratio i, it is found that, during the selecting and shifting, constructively two different ratios can be selected. Only when R3 is selected to be equal to R2 are the selection ratio I and the shift ratio i equal.

Figure 3:
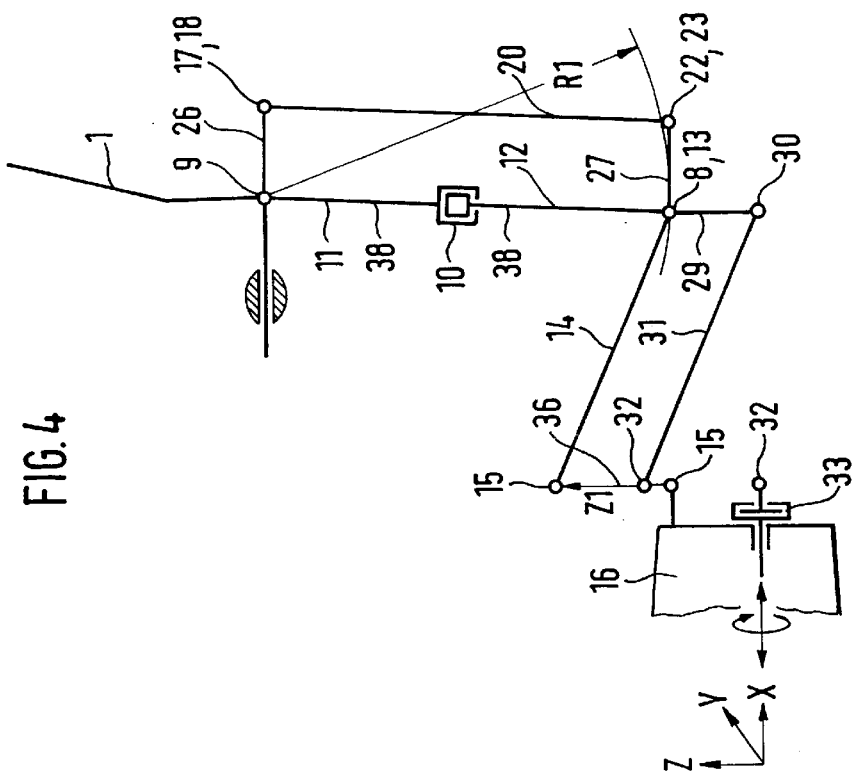
FIG. 3 is a view of the kinematic model of FIG. 2 projected onto the shifting plane, two different positions of the motion gearing (solid and broken) showing its method of operation when the motor vehicle transmission is displaced in the X-direction.
Figure 4:
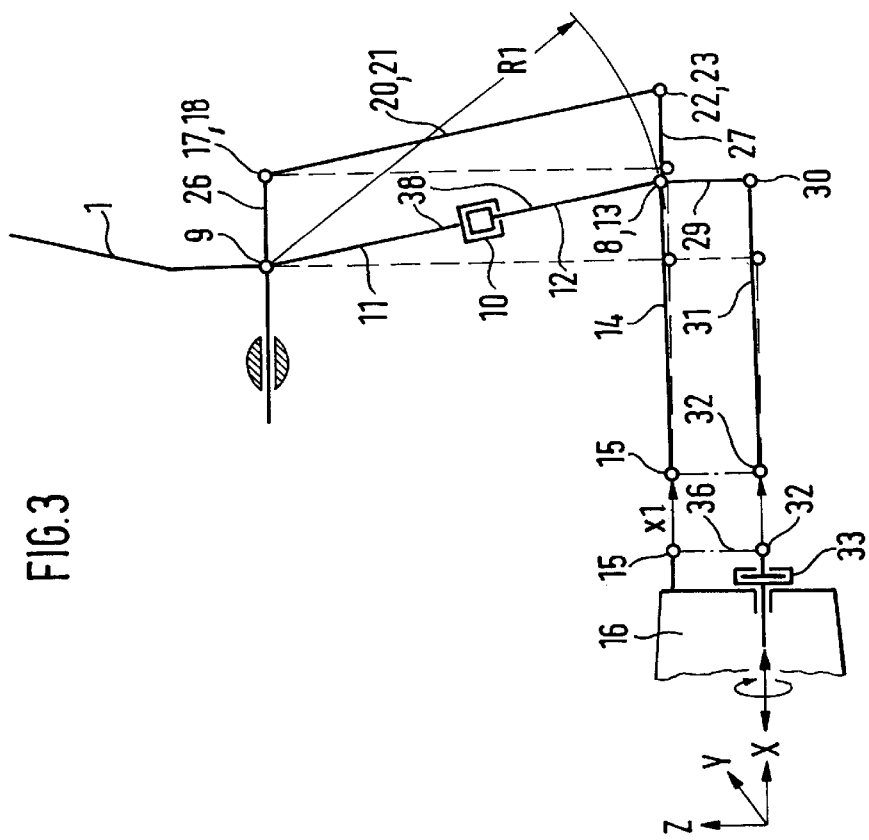
FIG. 4 is a representation according to FIG. 3 but for a deflection of the motor vehicle transmission in the Z-direction.

FIGS. 3 and 4 show the function of the motion gearing of the operating device on the example of the movement of the motor vehicle transmission case 16. A corresponding situation exists for vibrations of the transmission line parts. In all driving conditions, particularly when driving on uneven roads—start/stop of the engine, load changes on the transmission line and high rotational speeds of the engine—, the engine, together with the transmission, carries out a three-dimensional movement in its three axes—longitudinal axis X, transverse axis Y and vertical axis Z—as well as a rotational movement about each of these three axes. These relative movements of the transmission line to the vehicle body, because of the motion gearing, are not transmitted to the shift lever 1, as illustrated in FIG. 3 on the example of a movement of the motor vehicle transmission case 16 along the X-axis.

If the motor vehicle transmission case 16 moves along the X-axis by the amount x1, the fourth ball-and-socket joint 15 and the axis 32 are moved by the same amount into the corresponding direction. The holding element 38 is set in motion by the support rod 14 and the shift rod 31 and rotates about the fastening axis 9 with the radius R1. During this rotation, the third rod continues to remain parallel to the first rod 26 and the holding element 38 remains parallel to the invisible plane 25 of the four-bar mechanism with the coupling rods 20 and 21.

A rotational movement of the corresponding components takes place about the first 17, 18 and the second 22, 23 ball-and-socket joints and about the third ball-and-socket joint 8, the fastening axis 9, the swivel axis 13, the third axis 30 and the axes 32, 33 being axes of rotation. In this case, the shift lever 1 remains immobile.

A displacement of the motor vehicle transmission case 16 along the Y-axis initiates a rotation of the lower holding element part 21 about the joint 10. The upper holding element part 11 does not rotate. Simultaneously, the holding element 38 is pulled axially toward the front so that it rotates about the fastening axis 9 with the radius R1. A rotation of the corresponding components takes place about the first 17, 18 and the second 22, 23 ball-and-socket joints, furthermore about the third 8 and the fourth 15 ball-and-socket joint. In this case, the corresponding components rotate about the fastening axis 9, the swivel axis 13, the third axis 30 and the axes 32 and 33. The shift lever 1 remains immobile.

In a corresponding manner, FIG. 4 shows a movement of the motor vehicle transmission case 16 along the Z-axis.

The displacement of the motor vehicle transmission case 16 along the Z-axis initiates a rotation of the holding element 38 about the fastening axis 9 with the radius R1. Simultaneously, the holding element 38 is pulled axially toward the front. A rotation of the corresponding components takes place about the first 17, 18 and the second 22, 23 ball-and-socket joints and about the third 8 and the fourth 15 ball and socket joint. In this case the corresponding components rotate about the fastening axis 9, the swivel axis 13, the third axis 30 and the axes 32 and 33. The shift lever 1 again remains immobile.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Operating device for a motor vehicle transmission having a shift lever for shifting between transmission ratios, said shift lever being mounted on the motor vehicle and adapted to be swivelled essentially in the longitudinal direction of the vehicle in shifting channels about a shifting axis and swivelled essentially in the transverse direction of the vehicle between different shifting channels in at least one selection channel about a selection axis, said shift lever being connected with at least one transmission control shaft of the motor vehicle transmission by a motion gearing, a motor vehicle transmission case being linked to the motion gearing, wherein the shift lever is mounted on a vehicle part fixed to the vehicle body, and wherein the motion gearing, when projected onto a shifting plane, includes at least four rods forming a parallelogram linkage, one of said four rods being fixedly connected with the shift lever, and wherein during a shifting and/or selecting movement of the shift lever, the rod being fixedly connected to the shifting lever maintains position one end thereof swivellably mounted on a vehicle part fixed to the vehicle body in the shifting plane and another end thereof connected with the motor vehicle transmission case and is movable over at least so many degrees of freedom that spatial movement of the motor vehicle transmission case is possible while reducing reaction forces in the motion gearing, and three of the four rods change position during shifting and/or selecting movement of the shift lever.

2. Operating device according to claim 1, wherein the three rods of the parallelogram linkage which, in a projection onto the shifting plane change in position during a shifting and/or selecting movement of the shift lever, are formed by a first rod extending between the shift axis and at least one first connection joint to a coupling element, by at least one second rod positioned between the first connection joint and at least one second connection joint to a connection element by a third rod positioned between the second connection joint and a third connection joint of a fourth rod, said fourth rod being the rod of the parallelogram linkage which maintains position during a shifting and/or selecting movement of the shift lever.

3. Operating device according to claim 2, wherein the first rod is formed by the shift lever, the second rod is formed by the coupling element and the third rod is formed by the connection element.

4. Operating device according to claim 1, wherein the rod fixedly connected with the shift lever is, on one end, linked swivellably about a fastening axis to a vehicle part fixed to the vehicle body and, on the other end, is rotatably connected to a third connection joint.

5. Operating device according to claim 2, wherein the fourth rod, at the one end, is linked swivellably about a fastening axis to a vehicle part fixed to the vehicle body and, at another end, is rotatably connected to a third connection joint.

6. Operating device according to claim 3, wherein the fourth rod, at the one end, is linked swivellably about a fastening axis to a vehicle part fixed to the vehicle body and, at the other end, is rotatably connected to a third connection joint.

7. Operating device according to claim 4, wherein the shifting axis and the fastening axis are coaxial when the shift lever is not deflected about the selecting axis.

8. Operating device according to claim 5, wherein the shifting axis and the fastening axis are coaxial when the shift lever is not deflected about the selecting axis.

9. Operating device according to claim 6, wherein the shifting axis and the fastening axis are coaxial when the shift lever is not deflected about the selecting axis.

10. Operating device according to claim 4, wherein the connection to the motor vehicle transmission case is established from the other end of the rod fixedly connected with the shift lever by means of a support rod.

11. Operating device according to claim 5, wherein the connection to the motor vehicle transmission case is established from the other end of the fourth rod by means of a support rod.

12. Operating device according to claim 6, wherein the connection to the motor vehicle transmission case is established from the other end of the fourth rod by means of a support rod.

13. Operating device according to claim 7, wherein the connection to the motor vehicle transmission case is established from the other end of the rod fixedly connected to the shift lever by means of a support rod.

14. Operating device according to claim 8, wherein the connection to the motor vehicle transmission case is established from the other end of the fourth rod by means of a support rod.

15. Operating device according to claim 9, wherein the connection to the motor vehicle transmission case is established from the other end of the fourth rod by means of a support rod.

16. A shifting assembly for a motor vehicle transmission having a transmission control shaft extending from a transmission case which is movable with respect to a vehicle body during vehicle driving operations, said shifting assembly comprising:

a manually operable shift lever movable in a shifting channel for changing transmission gears and in a selecting channel connected with another shifting channel, and motion gearing connecting the shift lever with the transmission control shaft while accommodating movements of the transmission case with respect to the vehicle body while maintaining the shift lever in predetermined shift lever adjusted positions with respect to the vehicle body.

17. A shifting assembly according to claim 16, wherein said motion gearing includes a parallelogram linkage having three rods which are movable with respect to the vehicle body in response to movement of the transmission casing and a fourth rod fixedly connected with the shift lever.

18. A shifting assembly according to claim 17, wherein said motion gearing includes a support rod connecting the transmission casing with said parallelogram linkage.

19. Operating device according to claim 2, wherein the connecting element is mounted on the fourth rod by means of a ball joint.

20. Operating device according to claim 19, wherein a support rod for the vehicle transmission housing is pivotably mounted on the fourth rod, with a pivot axis which passes through a midpoint of the ball joint.

21. Operating device according to claim 3, wherein the connecting element comprises an angle lever with an end of a first leg being pivotably movably connected with a shift rail and an end of a second leg being movably connected with a coupling element in such fashion that both the selecting movement and the shifting movement of the shift lever are transmitted through the coupling element and angle lever to the shift rail.

22. Operating device according to claim 2, wherein the fourth rod comprises an upper retaining element and a lower retaining element part, both retaining element parts being connected by a joint in such fashion that they are rotatable with respect to one another around a retaining element lengthwise axis.

23. Operating device according to claim 2, wherein the coupling element comprises two coupling rods that form a four-link drive, and wherein the connecting element in a plane perpendicular to the shift plane, with at least two members of the four-link drive, the shift lever and the connecting element, are guided parallel to one another.

* * * * *